United States Patent [19]
le Blanc et al.

[11] Patent Number: 5,195,894
[45] Date of Patent: Mar. 23, 1993

[54] BRAILLE MOUSE HAVING CHARACTER CODE MEMBER ACTUATED BY SINGLE SOLENOID

[75] Inventors: Pieter W. C. J. le Blanc, Pollock Pines; Timothy R. Maher, Orangevale, both of Calif.

[73] Assignee: Nimbus, Inc., Rancho Cordova, Calif.

[21] Appl. No.: 701,458

[22] Filed: May 15, 1991

[51] Int. Cl.⁵ .............................................. G09B 21/00
[52] U.S. Cl. .................... 434/114; 434/113; 434/112
[58] Field of Search .................. 434/112, 113, 114; 400/122

[56] References Cited

U.S. PATENT DOCUMENTS 4,664,632 5/1987 Tretiakoff et al. .................. 434/114

FOREIGN PATENT DOCUMENTS

| 0280608 | 8/1988 | European Pat. Off. | 434/112 |
| 3035852 | 5/1982 | Fed. Rep. of Germany | 434/113 |
| 3044599 | 7/1982 | Fed. Rep. of Germany | 434/114 |
| 3706286 | 9/1988 | Fed. Rep. of Germany | 434/112 |
| 0053067 | 3/1986 | Japan | 400/122 |

Primary Examiner—John J. Wilson
Assistant Examiner—Jeffrey A. Smith
Attorney, Agent, or Firm—Weissenberger, Peterson, Uxa & Myers

[57] ABSTRACT

A Braille mouse uses a character-code carrying member such as a disc, belt or drum to selectively raise Braille pins with a single solenoid. The Braille pins are provided with eccentric fingers which interact with a character-code carrying member, so that the character codes can be arranged in straight radial lines to allow all possible six-pin Braille symbols to be provided on a member of minimum size.

20 Claims, 8 Drawing Sheets

BRAILLE MOUSE HAVING CHARACTER CODE MEMBER ACTUATED BY SINGLE SOLENOID

FIELD OF THE INVENTION

This invention relates to a mouse-like computer accessory which enables visually handicapped operators to read text on a computer screen in Braille format, and more particularly to a novel Braille displaying mechanism for such a device.

BACKGROUND OF THE INVENTION

Various method have been proposed for translating text on a computer screen into Braille symbols capable of being perceived by visually handicapped persons. Among such methods is the use of a mouse which can be used to move a cursor along text lines on a screen, and which contains a set of raisable pins that spell out in Braille the character at the cursor position. A problem with such mice is that they require a plurality of solenoids (usually six) to operate the Braille pins. As a result, such devices are cumbersome and expensive, consume substantial power, generate considerable heat in prolonged use, and present maintenance problems. Consequently, there is a need for a simple, inexpensive, compact and reliable mechanism for actuating the pins of a Braille mouse.

SUMMARY OF THE INVENTION

The invention fills the above-stated need by providing a movable character element bearing character indicia which, when pressed into engagement with appropriately configured Braille pins, cause a selected pin combination to be raised above the surface of the device under the control of a single solenoid. In one preferred embodiment of the invention, the character element may take the shape of a character disc with axial flexibility but radial integrity, using a coded wheel mechanism to circumferentially position the rim of the disc under the Braille pins, and using a single solenoid to push the disc into engagement with the pin.

In another preferred embodiment, the character element is a flexible endless belt carrying the character indicia. The single solenoid presses a selected section of the belt into engagement with the Braille pins.

In a third preferred embodiment of the invention, the character element is a hard wheel which carries the character indicia on its rim. The wheel is normally spring-biased against the Braille pins but is retracted away from them by the single solenoid while the wheel is rotated to another character position.

In a second aspect of the invention common to all three preferred embodiments, the size of the character element is minimized without loss of characters by encoding the character indicia in a linear pattern, and translating that pattern into the box pattern of the Braille alphabet by using eccentrically actuated push pins or fingers.

BRIEF DESCRIPTION OF THE DRAWINGS

FIG. B is a detail sction along line 3B,C—3B,C of FIG. 3A illustrating a sub-embodiment in which the character indicia raise all except selected pins.

DESCRIPTION OF THE PREFERRED EMBODIMENT

In the following discussion, the device of this invention is described as a mouse, i.e. a device which conventionally uses a track ball to electronically move a cursor on a computer screen. It should be understood, however, that the invention may equally be embodied, with the same advantages, in a stationary mouse-like accessory used in connjunction with a keyboard or other apparatus which allows moving the cursor position independently of the inventive device.

Figure 1:
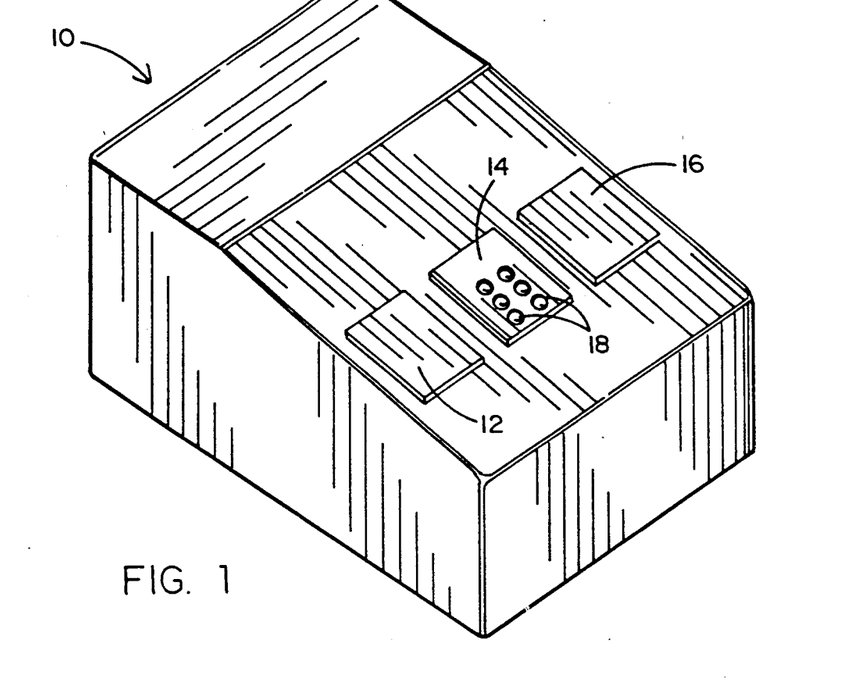
FIG. 1 is a perspective outside view of the device of this invention.

FIG. 1 illustrates the Braille mouse 10 of this invention from the user's perspective. Preferably, the mouse 10 is grasped between the thumb and little finger, with the index finger resting on the line-up button 16, the middle finger resting on the Braille pad 14, and the ring finger resting on the line-down button 12 (as explained below, the mouse 10 can move the cursor only horizontally). As the mouse 10 is moved from side to side to scan a line of text on a computer screen (not shown), the pins 18 on the Braille pad 14 at any given time spell out the character which appears at the cursor location at that time.

Figure 2:
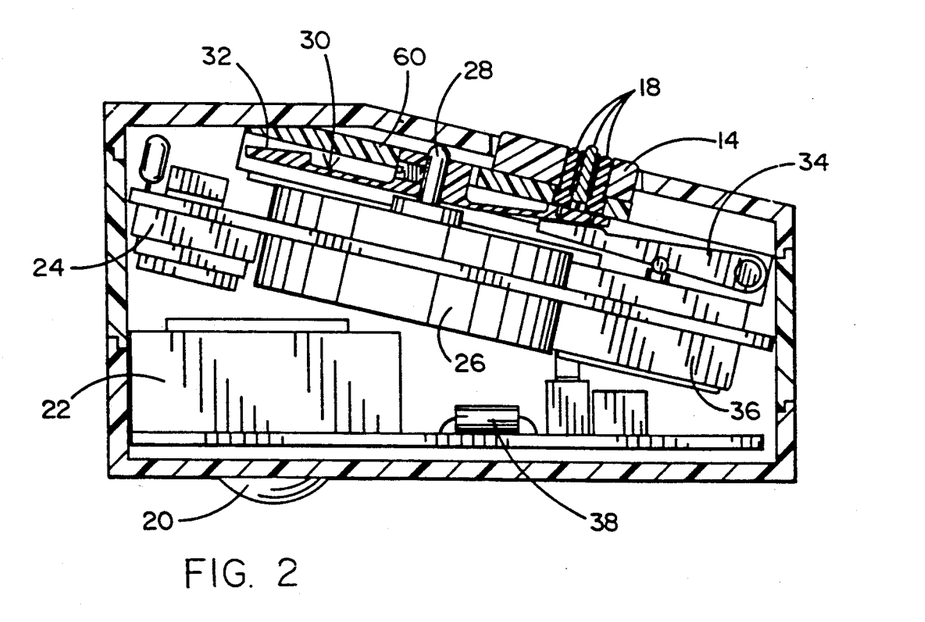
FIG. 2 is a vertical section through a first embodiment of the device of FIG. 1 illustrating a disc-type actuating mechanism in accordance with this invention.

A first preferred mechanism which accomplishes the foregoing objective is shown in FIG. 2. The movement of the mouse 10 is conventionally sensed by the track ball 20 and is translated by conventional sensor electronics 22 into cursor positioning coordinate changes which are transmitted to the computer. To prevent unintended line changes, the vertical motion sensor in electronics 22 is physically or electronically disables in the mouse 10 when the mouse 10 is used as a Braille mouse. In that mode, buttons 12 and 16 are used to convey vertical positioning information to the computer. Alternatively, in a track ball-less embodiment of the invention, the cursor position coordinates may be changed by, e.g., keystrokes on a keyboard.

The identity of the character at the cursor position is conveyed to the mouse 10 by conventionally designed electronics in the computer (not shown), whose nature depends upon the type of computer involved and is not material to this invention. This identity information is translated by appropriate electronics 24 into an actuating signal for the stepper motor 26 which turns the disc spindle 28. Mounted on the spindle 28 is a code information disc 30 whose rim 32 can be pushed into engagement with the pins 18 by the actuator arm 34 upon energization of the solenoid 36. Conventional interlock electronics 38 assure that the solenoid 36 is de-energized while the disc 30 is in motion.

Figure 3:
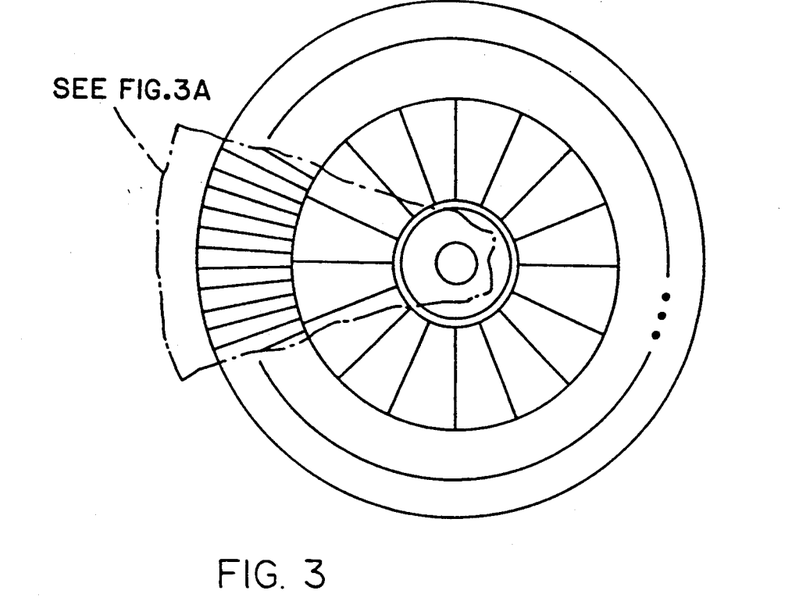
FIG. 3 is a generalized plan view of the character disc of FIG. 2.
Figure 3A:
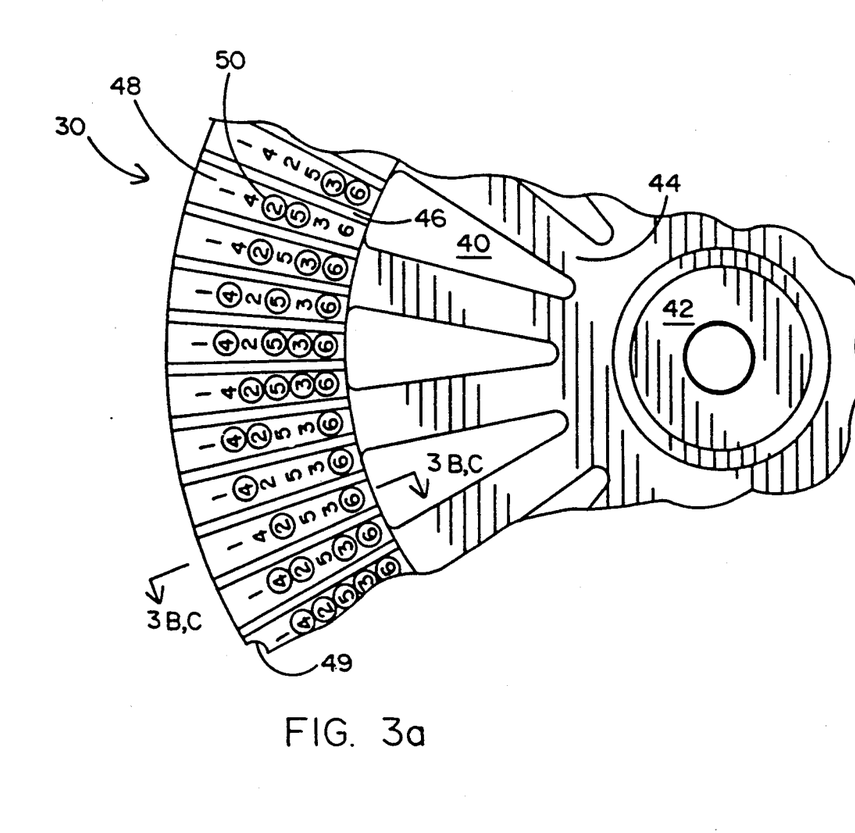
FIG. 3A is a detail plan view of a portion of the character disc.

The code information disc 30 is shown in more detail in FIGS. 3 and 3A. The disc 30 must satisfy two sets of inconsistent requirements: it must be radially stiff and strong but axially highly flexible, and it must be small yet carry on its rim 32 all sixty-four possible combinations of the six Braille pins 18 (the sixty-four character set can be expanded to 126 characters or more by using one or more of the characters as a prefix which appears momentarily before another character).

To satisfy the former requirement set, the disc 30 is provided with cutouts 40 between its hub 42 and its character code carrying rim 32. The cutouts 40, the thinness of the web 44 between the hub 42 and the rim 32, and the radial grooves 46 formed between the character pads 48 all cooperate to give the disc 30 considerable flexibility in an axial direction while preserving its radial and circumferential integrity. An index marker 49 may be provided to conventionally cooperate with an optical, magnetic or mechanical indexing device (not shown) to maintain the positional accuracy of the character disc 30.

Figure 3B:
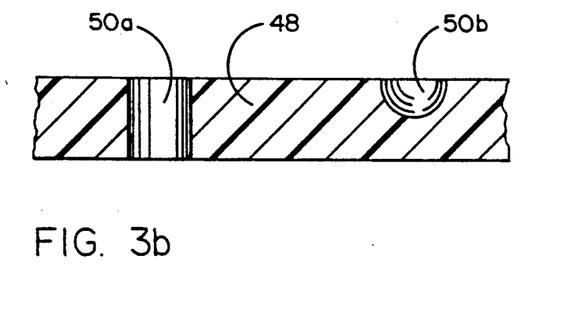

The second requirement set is satisfied by arranging the characer code for each characer in a straight line rather than in the box format of Braille symbols. Specifically, each character pad 48 carries a character code in the form of indicia 50 (openings 50a or depressions 50b in the rim surface in FIG. 3B) whose radial positions "1" through "6" correspond to the numbers of the Braille pins 18 which remain retracted when that character is displayed.

Figure 3C:
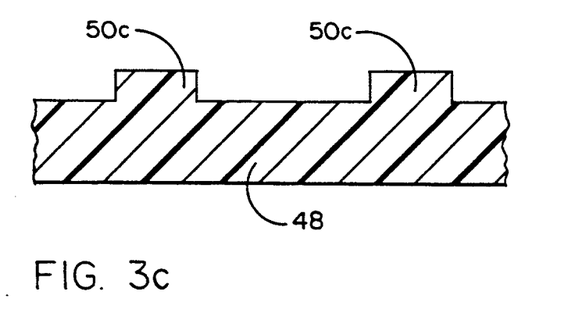
FIG. 3C is a detail section along line 3B,C—3B,C of FIG. 3A illustrating another sub-embodiment in which the character indicia raise only selected pins.

Alternatively, the indicia 50 may be protuberances 50c (FIG. 3C) whose radial positions "1" through "6" correspond to the numbers of the Braille pins 18 which are to be extended.

Figures 4, 5:
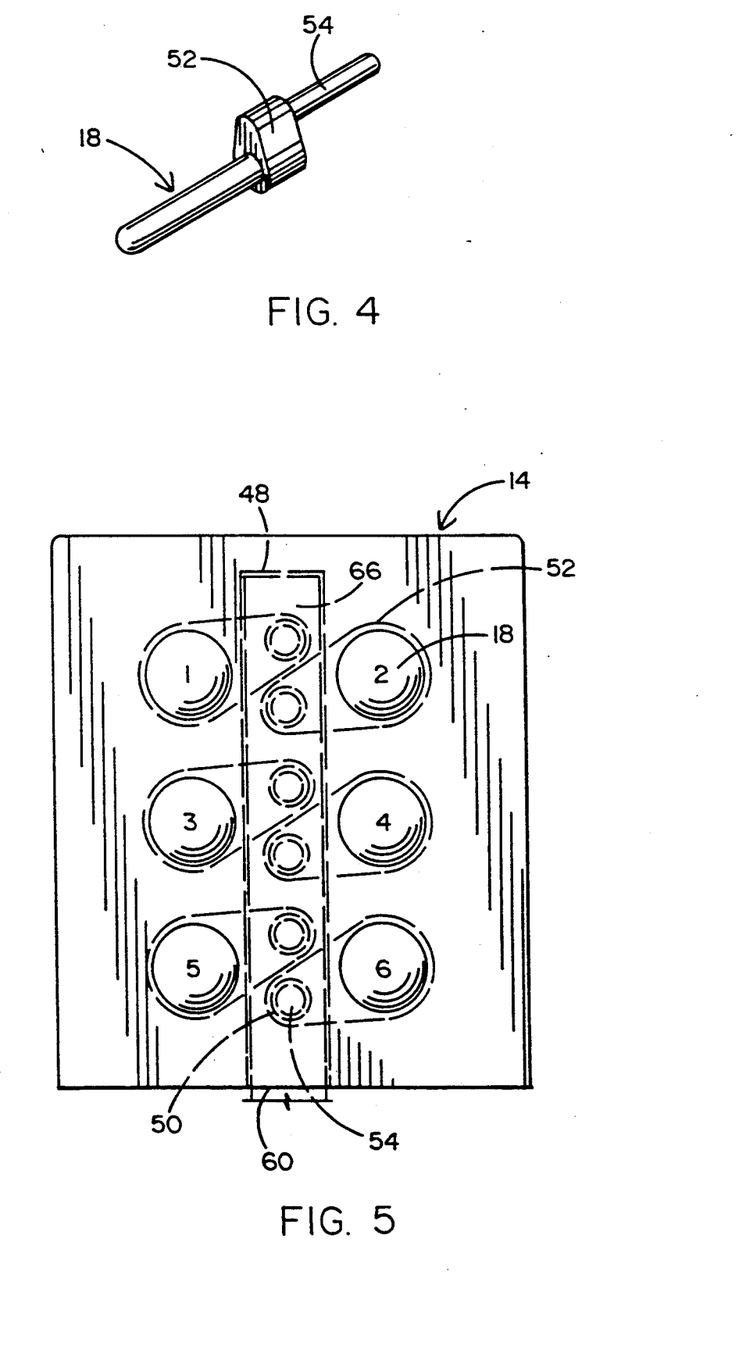
FIG. 4 is a perspective view of a push pin used in the mouse of FIG. 1.
FIG. 5 is an enlarged partial plan view of the Braille pin pad.

The radially linear arrangement of the character codes on the character pads 48 is translated into the Braille-cell form by the eccentric push pins 18 which are shown in more detail in FIGS. 4 and 5. Each pin 18 has a flange 52 from which an eccentrically mounted finger 54 extends downwardly. As indicated in FIG. 5, the eccentricities of the fingers 54 are so oriented that the fingers 54 lie in a radial line with respect to the disc hub 42.

Figure 6A:
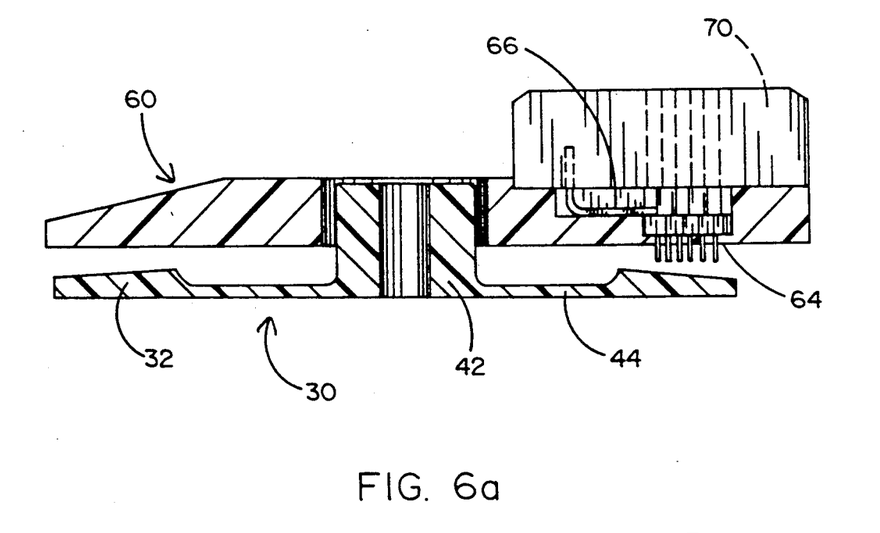
FIG. 6A is an exploded detail view of the pin mechanism.
Figure 6B:
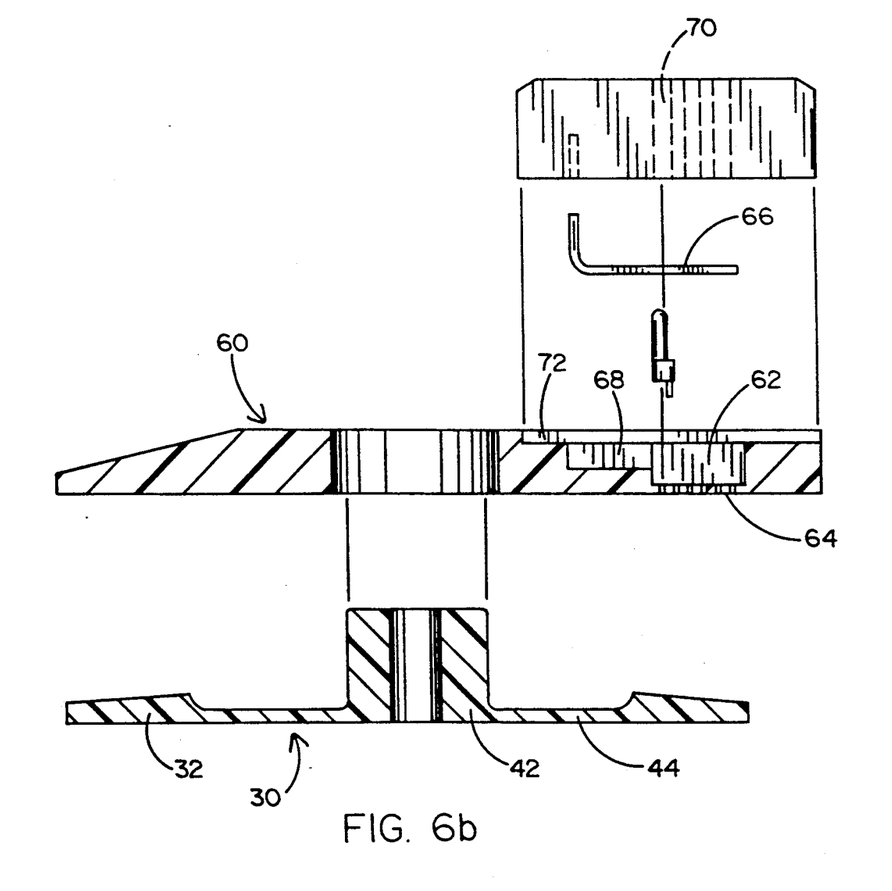
FIG. 6 is an enlarged assembled vertical section of the pin mechanism of FIG. 1.

FIGS. 6 and 6A show the detail of the Braille pin mechanism. As best seen in the exploded view of FIG. 6A, the top plate 60 of the mouse 10 has a cavity 62 formed therein in which the pins 18 are disposed. The fingers 54 of the pins 18 are confined in guide holes 64 for proper alignment. A leaf spring 66 disposed in a channel 68 engages the upper surfaces of flanges 52 and biases them downward. The upper portions of Braille pins 18 are retained for up-and-down movement in guide holes 70 in the Braille pad 14.

Figure 7:
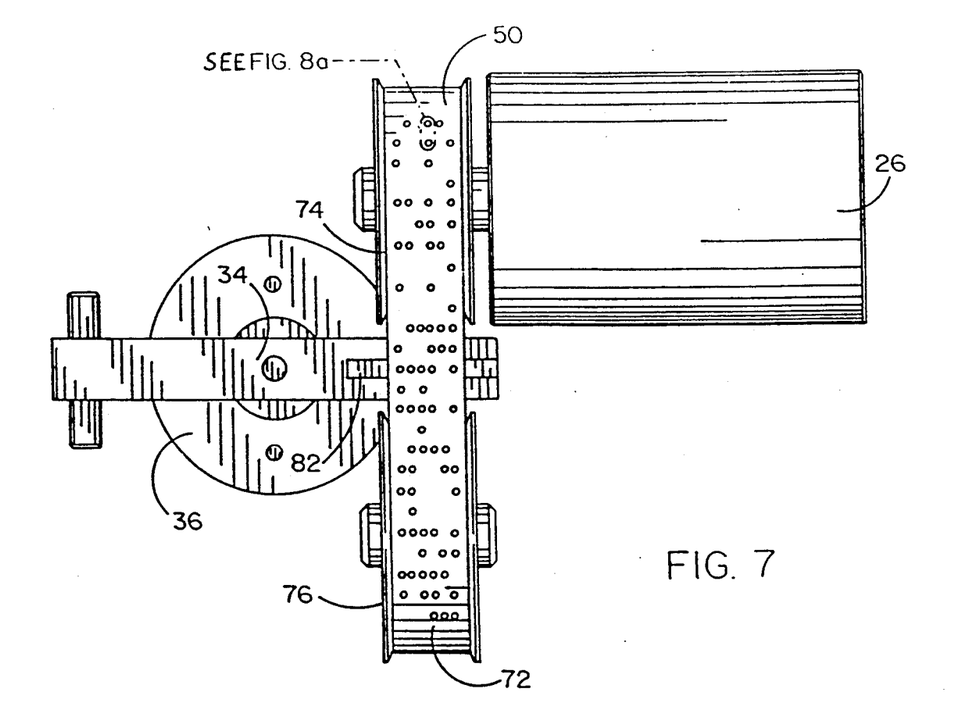
FIG. 7 is a side elevational view of a second embodiment illustrating a belt-type actuating mechanism.
Figure 8:
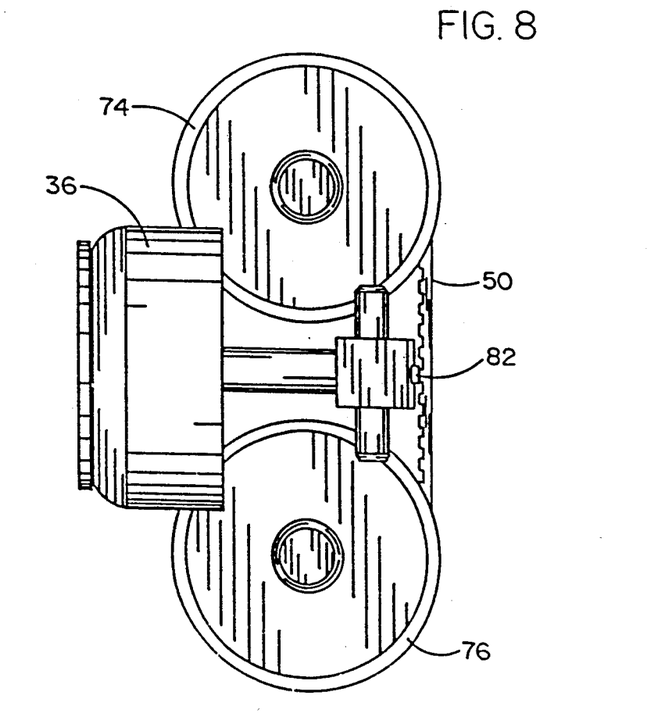
FIG. 8 is an end elevational view of the embodiment of FIG. 7.
Figure 8A:
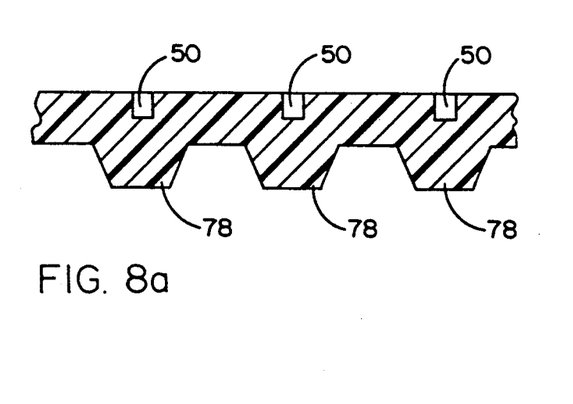
FIG. 8A is a section along line 8A of FIG. 7.

FIGS. 7, 8 and 8A illustrate an alternative embodiment of the actuating mechanism of this invention. In this embodiment, the character indicia 50 (which, as in the first-described embodiment, may be recessed or protruding) are positioned on a flexible belt 72 extending over a drive pulley 74 driven by the stepper motor 26, and an idler pulley 76. The belt 72 is provided with teeth 78 which engage teeth on the drive pulley 74 to prevent the belt 72 from slipping with respect to the drive pulley 74. As in the first-described embodiment, the pressure plate 82 on level arm 34 of the solenoid 36 presses the belt 72 into engagement with the Braille pins 18 when the solenoid 36 is energized.

Figure 9:
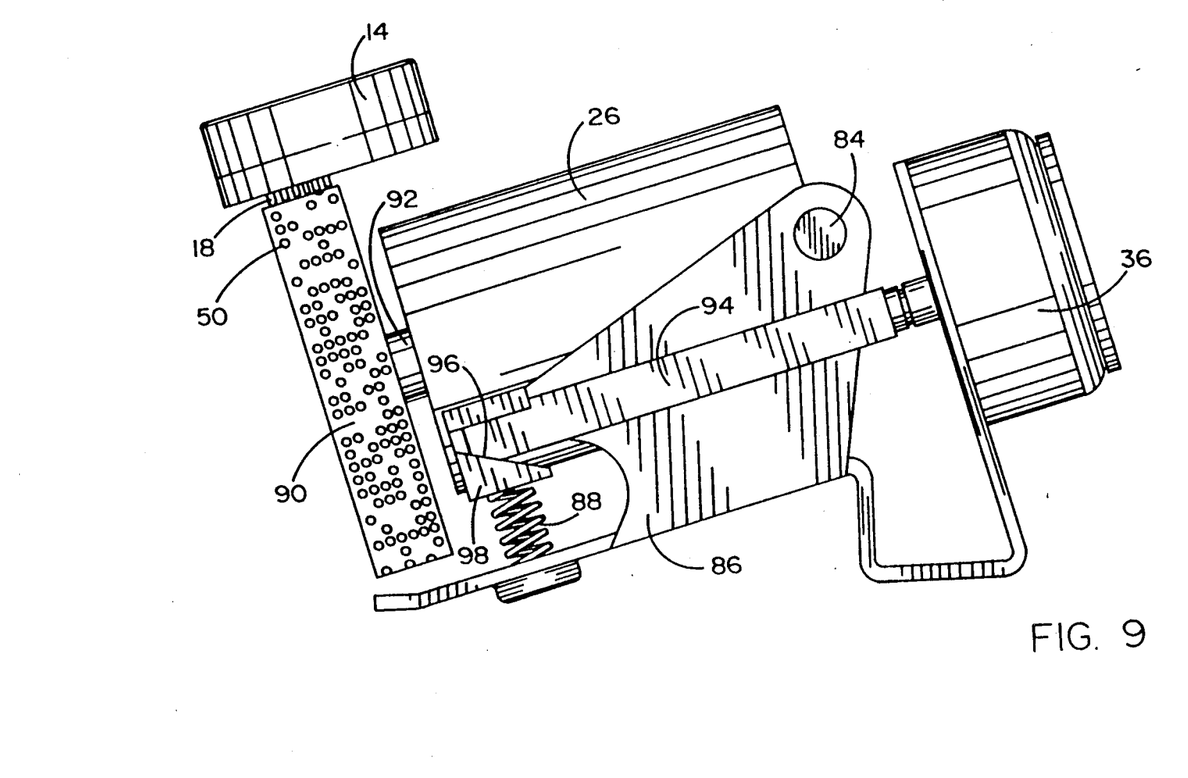
FIG. 9 is a side elevational view of a third embodiment illustrating a wheel-type actuating mechanism.
Figure 10:
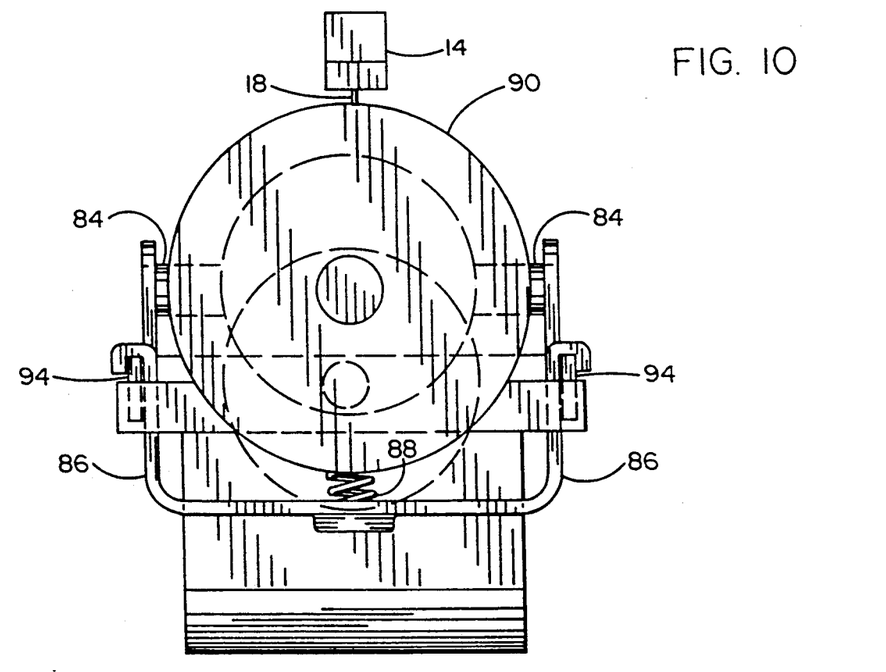
FIG. 10 is an end elevational view of the embodiment of FIG. 9.

FIGS. 9, 10 and 10A show a third embodiment of the pin actuating mechanism of this invention, and also illustrate a method, applicable in principle to all three embodiments, of reducing the power consumption and heat generation of solenoid 36. In this third embodiment, the stepper motor 26 is pivotably supported on a swivel pin 84 in a swivel bracket 86. The swivel bracket 86 in this embodiment fixedly supports the solenoid 36. A stiff character drum 90 is fixedly mounted on the shaft 92 of stepper motor 26. The character indicia 50 are carried on the surface of drum 90.

Normally, the spring 88 biases the character drum 90 against the Braille pins 18 contained in the pad 14. When the solenoid 36 is energized, it pushes the actuator 94 to the left in FIG. 9. This causes the inclined surface 96 of actuator 94 to push the wedge arm 98 attached to stepper motor 26 downwardly against the bias of spring 88, thereby pivoting the motor 26 counterclockwise about the swivel pin 84 and pulling the character drum 90 out of engagement with pins 18. Thus, the character drum 90 can be freely rotated to another character position while the solenoid 36 is energized.

The embodiment of FIGS. 9, 10 and 10A has two advantages: the provision of a stiff character drum 90 reduces the risk of character element failure due to flexing fatigue, and the energizing of the solenoid 36 during indexing rather than during character display prevents the continuous energization of the solenoid 36 if the cursor is left on a character of the computer screen. Also, the indexing time from one character to the next is statistically shorter, on the average, than the dwell time on a character being read by the operator.

We claim:

1. Apparatus for receiving from a computer signals identifying a character at a cursor position, and displaying said character in Braille format, comprising:
   a) means for receiving character-identifying signals from said computer;
   b) a character code member carrying character indicia;
   c) motor means cooperating with said receiving means and said character code member for moving said character code member into predetermined positions in response to said character-identifying signals;
   d) a set of Braille pins positioned adjacent said character code member, each pin being movable between a retracted position and an extended position in which it projects from said apparatus;
   e) a single solenoid;
   f) means for operating said solenoid in response to said character code member being in one of said predetermined positions; and
   g) actuating means operatively interconnecting said solenoid, character code member, and pins so as to move selected ones of said pins between said retracted and extended positions in response to said character code nearest said pins, and to the operation of said solenoid.

2. The apparatus of claim 1, in which said character code member is an axially flexible disc carrying said character codes on its rim, and said motor means are arranged to rotate said disc into predetermined rotational positions in which selected sections of said rim are aligned with said pins.

3. The apparatus of claim 2, in which said character code indicia are arranged in a line extending radially of said disc.

4. The apparatus of claim 2, in which said pins are disposed in a Braille box pattern and include eccentrically arranged finger means disposed in a line radially of said disc, said disc having thereon indicia disposed in a corresponding line, and said finger means cooperating with said indicia to raise selected ones of said pins when said disc is pressed against said finger means.

5. The apparatus of claim 2, in which said disc has a hub and a thin web between said hub and said rim, said web being cut out for a maximum axial flexibility while preserving maximum radial integrity.

6. The apparatus of claim 1, in which said character code member is a flexible belt carrying said character codes on its surface, and said motor means are arranged to position selected code-carrying areas of said belt into alignment with said pins.

7. The apparatus of claim 6, in which said character code indicia are arranged in a line extending transversely of said belt.

8. The apparatus of claim 6, in which said pins are disposed in a Braille box pattern and include eccentrically arranged finger means disposed in a line transversely of said belt, said belt having thereon indicia disposed in a corresponding line, and said finger means cooperating with said indicia to raise selected ones of said pins when said belt is pressed against said finger means.

9. The apparatus of claim 6, in which said belt has tooth means, and said motor means has toothed belt drive means associated therewith, said tooth means has toothed belt drive means cooperating to maintain the positional relation between said belt and said belt drive means.

10. The apparatus of claim 1, in which said character code member is a drum carrying said character codes on its periphery, and said motor means are arranged to rotate said drum into predetermined rotational positions in which selected areas of said periphery are aligned with said pins.

11. The apparatus of claim 10, in which said character code indicia are arranged in a line extending axially of said drum.

12. The apparatus of claim 10, in which said pins are disposed in a Braille box pattern and include eccentrically arranged finger means disposed in a line axially of said drum, said drum having thereon indicia disposed in a corresponding line, and said finger means cooperating with said indicia to raise selected ones of said pins when said drum is pressed against said finger means.

13. The apparatus of claim 10, in which said drum is mounted for pivotal movement into and out of engagement with said pins.

14. The apparatus of claim 1, in which said indicia are voids in the surface of said character code member.

15. The apparatus of claim 14, in which said pins have finger means, and the pins whose finger means positionally match said voids remain retracted when said character code member is pressed against said finger means.

16. The apparatus of claim 1, in which said character code indicia are protuberances on the surface of said member.

17. The apparatus of claim 16, in which said pins have finger means, and the pins whose finger means positionally match said protuberances are extended when said character code member is pressed against said finger means.

18. The apparatus of claim 1, in which said actuating means include means for pressing said character code member into engagement with said pins in response to the energization of said solenoid.

19. The apparatus of claim 1, in which said actuating means include means for withdrawing said character code member from engagement with said pins in response to the energization of said solenoid.

20. The apparatus of claim 1, further comprising track ball means for generating cursor position change signals for transmission to said computer when said track ball means are rotated.

* * * * *